United States Patent [19]

Yamada et al.

[11] Patent Number: 4,621,288

[45] Date of Patent: Nov. 4, 1986

[54] REFERENCE TIME DETECTING CIRCUIT

[75] Inventors: Hisafumi Yamada, Tokyo; Choei Kuriki, Urawa; Junya Saito, Wako, all of Japan

[73] Assignee: Sony Corporation, Tokyo, Japan

[21] Appl. No.: 515,043

[22] PCT Filed: Oct. 21, 1982

[86] PCT No.: PCT/JP82/00416

§ 371 Date: Jun. 20, 1983

§ 102(e) Date: Jun. 20, 1983

[87] PCT Pub. No.: WO83/01552

PCT Pub. Date: Apr. 28, 1983

[30] Foreign Application Priority Data

Oct. 21, 1981 [JP] Japan ................. 56-168062

[51] Int. Cl.[4] .................. H04N 5/05; H04N 5/93
[52] U.S. Cl. .................... 358/153; 358/148; 358/154; 358/155; 358/167
[58] Field of Search .......... 358/21 V, 153, 148, 358/154, 155, 176, 156, 177, 167, 905

[56] References Cited

U.S. PATENT DOCUMENTS 3,567,860 3/1971 Oliver ............................. 358/154
3,881,055 4/1975 Gerot ............................. 358/153
4,357,630 11/1982 Odaka ............................ 358/154
4,517,601 5/1985 Yamada .......................... 358/167

FOREIGN PATENT DOCUMENTS 58-64881 4/1983 Japan ............................. 358/148

Primary Examiner—Tommy P. Chin
Attorney, Agent, or Firm—Hill, Van Santen, Steadman & Simpson

[57] ABSTRACT

A reference time detecting circuit for detecting a predetermined transit of a synchronizing signal taken as a reference time of a video signal detects the reference time by using a masking pulse including the predetermined transit and the video signal. The level for detecting the transit is set at a side over a half level of the synchronizing signal level, and a detecting signal and the masking pulse are supplied to a flip-flop circuit (60) from which an output signal is derived. Since the level for detecting the transit is set at the side over the half level of the synchronizing signal level, the reference time can be detected by a first pulse in a range of the masking pulse. Furthermore, since this signal and the masking pulse are supplied to the flip-flop circuit (60), a reference time signal can be formed quite easily.

4 Claims, 22 Drawing Figures

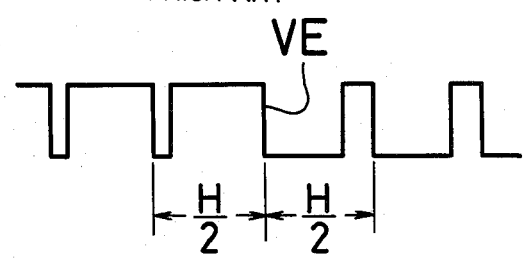
FIG. 2
PRIOR ART
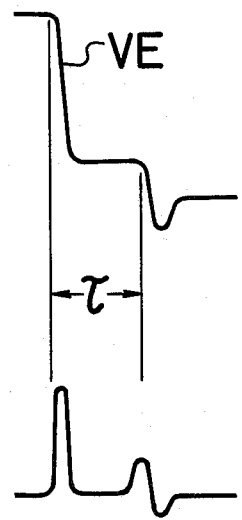
FIG. 3A
PRIOR ART
FIG. 3B
PRIOR ART

– 1 –

REFERENCE TIME DETECTING CIRCUIT

TECHNICAL FIELD

This invention relates to a reference time detecting circuit suitable for a ghost signal cancelling apparatus which cancels out a ghost in, for example, a video signal stage.

BACKGROUND ART

As, for example, shown in FIG. 1, a signal received by an antenna 1 is supplied through a tuner 2 and a video intermediate frequency amplifier 3 to a video signal detecting circuit 4 by which a video signal is detected. This video signal is supplied through a delay circuit 5 of which the delay time corresponds to the period of duration necessary for cancelling out a pre-ghost signal to a composer 6. Also, a ghost imitating signal from a transverse filter which will be described later is supplied to the composer 6 and thus the composer 6 supplies therefrom a video signal whit a ghost signal eliminated to an output terminal 7.

The video signal derived from the video signal detecting circuit 4 is supplied to a delay circuit 8 which constructs the transversal filter. The delay circuit 8 is formed such that delay elements each of which has a sampling period (for example, 10 nano seconds) taken as a unit of delay are connected in plural stages (n in number) so as to achieve a delay time equal to the pre-ghost signal eliminating period and n taps are led out from the respective stages. The signals from the respective taps are supplied to weighting circuits $9_1, 9_2, \ldots 9_n$, each of which is formed of a multiplier.

The signal from the last stage of the delay circuit 8 is supplied to a terminal $10f$ of a mode switch 10, while the output signal from the composer 6 is supplied to a terminal $10b$ of the switch 10. The signal from the switch 10 is supplied to a delay circuit 11. The delay circuit 11 is formed such that delay elements, each of which has a sampling period taken as a unit of delay, are connected in plural stages (m in number) so as to achieve a delay time equal to the delay-ghost eliminating period and m taps are led out from the respective stages. The signals from the respective taps are supplied to weighting circuits $12_1, 12_2 \ldots 12_m$, each of which is formed of a multiplier.

The video signal from the composer 6 is supplied to a subtracting circuit 13. The video signal from the delay circuit 5 is supplied to a synchronizing separating circuit 14 and the separated vertical synchronizing signal therefrom is supplied to a standard waveform generating circuit 15 and a low-pass filter 16 wherein a standard waveform approximate to a step waveform of a rising edge VE of the vertical synchronizing signal is formed. The standard waveform is supplied to the subtracting circuit 13.

The signal from the subtracting circuit 13 is supplied to a differentiating circuit 17 which detects the ghost signal.

As a signal for detecting and measuring the ghost signal, used is such one that is contained in a standard television signal and not affected by other signal during a period of a duration as long as possible, for example, the vertical synchronizing signal. That is, as shown in FIG. 2, the portion between the rising edge VE of the vertical synchronizing signal and the period of $\pm\frac{1}{2}H$ (H represents the horizontal period) before and after it is not affected by other signal. Therefore, the afore-said standard waveform is subtracted from the signal of such period and the subtracted signal is differentiated to thereby detect a weighting function.

If a video signal contains a ghost signal having, for example, a delay time $\tau$ and a phase difference $\phi$ ($=\omega_c\tau$ where $\omega_c$ is a video carrier angular frequency in a high frequency stage) of 45° between it and the video signal, a video signal of a waveform shown in FIG. 3A appears. On the other hand, if such signal is differentiated and inverted in polarity, a ghost detecting signal of a differentiated waveform shown in FIG. 3B is obtained. This differentiated waveform can approximately be regarded as an impulse response of the ghost signal.

The ghost detecting signal of differentiated waveform appearing from the differentiating circuit 17 is supplied through an amplifier 18 to demultiplexers 19 and 20 connected in series. The demultiplexers 19 and 20 are formed in the same way as in the delay circuits 8 and 11 wherein delay elements, each of which has a sampling period taken as a unit of delay, are connected in plural stages and m and n taps are led out from respective stages. The outputs from the respective taps are supplied to switching circuits $21_1, 21_2, \ldots 21_n$ and $22_1, 22_2 \ldots 22_m$.

The vertical synchronizing signal from the synchronizing separating circuit 14 is supplied to a gate pulse generator 23 which then generates a gate pulse of a duration corresponding to the interval from the rising edge VE of the afore-said vertical synchronizing signal to the end terminal of the $\frac{1}{2}H$ interval. This gate pulse turns on the switching circuits $21_1$ to $22_m$.

The signals from the switching circuits $21_1$ to $22_m$ are respectively supplied to analog accumulative adders $24_1, 24_2 \ldots 24_n$ and $25_1, 25_2 \ldots 25_m$. The signals from the analog accumulative adders $24_1$ to $25_m$ are respectively supplied to the weighting circuits $9_1$ to $9_n$ and $12_1$ to $12_m$.

The outputs from the weighting circuits $9_1$ to $9_n$ and $12_1$ to $12_m$ are added together in an adding circuit 26 thereby forming a ghost cancelling signal. This ghost cancelling signal is then supplied to the composer 6.

As set forth above, the delay circuits 8, 11, the weighting circuits $9_1$ to $9_n$, $12_1$ to $12_m$ and the adding circuit 26 constitute the transversal filter which serves to cancel out the ghost signal. In this case, the analog accumulative adders $24_1$ to $25_m$ are provided such that after the distortion of the waveform in the period between the rising edge of the vertical synchronizing signal and the $\pm\frac{1}{2}H$ interval before and after it is detected and the weighting function is determined, if the ghost signal still remains not cancelled, the detection as afore-said is further carried out to reduce the ghost signal not yet cancelled.

The elimination of the delay-ghost signal can be changed to a feedforward mode, a feedback mode and vice versa by switching the mode switch 10.

FIG. 4 shows a case in which an input-adding type transversal filter is employed to eliminate a ghost signal. In the figure, like parts corresponding to those in FIG. 1 are marked with the same references and will not be described in detail.

In the figure, the video signal from the video signal detecting circuit 4 is supplied to the weighting circuits $9_1$ to $9_n$, and the signals from the weighting circuits $9_1$ to $9_n$ are respectively supplied to input terminals of a delay circuit $8'$. The delay circuit $8'$ is formed such that n delay elements, each of which has a sampling period as a unit of delay are connected and n input terminals are provided at portions between the respective stages.

The signals at the input and output sides of the composer 6 are supplied to terminals 10f' and 10b' of a mode switch 10'. The signal from the switch 10' is supplied to the weighting circuits $12_1$ to $12_m$ and the signals from the weighting circuits $12_1$ to $12_m$ are respectively supplied to input terminals of a delay circuit 11'. The delay circuit 11' is formed such that m delay elements, each of which has a sampling period as a unit of delay, are connected and m input terminals are provided at portions between the respective stages thereof.

The signals derived from the last stages of the delay circuits 8' and 11' are added together in an adding circuit 26' so as to form a ghost cancelling signal. This ghost cancelling signal is supplied to the composer 6.

This circuit can also eliminate the ghost signal in the same way as in the afore-said circuit having the output-adding type transversal filter.

Furthermore, in accordance with the afore-said circuit, without the differentiating circuit 17, a difference of outputs between the adjacent bits from the demultiplexers 19 and 20 is used to obtain a difference output and the weighting operation can be performed by the use of such difference output.

Moreover, if the demultiplexers 19, 20 and the delay circuits 8, 11 are used in common and upon determining the weighting amount the weighted signals are supplied to the delay circuits and then stored in memory elements, the weighting operation can be carried out by the stored signals thereafter.

In this way, the ghost signal can be eliminated in, for example, the video signal stage.

By the way, in such ghost signal cancelling apparatus, the formation of the standard waveform and the switching timing of the switching circuits $21_1$ to $22_m$ are determined by, for example, the rising edge of the vertical synchronizing signal taken as a reference time. In that case, quite a high precision is required for the detection of the reference time and the experiment reveals that the precision must be within 35 nano seconds.

However, since the conventional synchronizing separating circuit includes therein a low-pass filter, a high frequency band range information is dropped and the rising edge or the like of the signal is blunted. As a result, if the reference time is detected from the vertical synchronizing signal thus separated, the reference time may be delayed.

Therefore, it has been proposed that a masking pulse of about ½H period long which includes the rising edge of, for example, the vertical synchronizing signal is formed and this masking pulse and the video signal are employed to directly detect the transit of the rising edge.

However, in the case of such previously proposed method, the influence of noise and so on causes an erroneous detection frequently. That is, when detecting the transit, a threshold level is provided to detect a time point at which the signal goes across this level. In general, this threshold level is selected as a half level between sync-tip and pedestal level. In that case, when a noise level is small as shown in FIG. 5A, quite a precise detection can be carried out. On the contrary, when a noise level is large as shown in FIG. 5B and this noise exceeds the half level, an error pulse occurs at each time so that the correct reference time cannot be detected.

The reason for this is that, since the influence of a synchronizing separating clamping circuit provided at the input side of the detecting circuit causes the sync-tip to pedestal portions to be enlarged enormously particularly when the electric field is weak and the noise level is also enlarged enormously in accordance therewith, a bad influence occurs easily.

In view of such aspects, the present invention is to provide a reference time detecting circuit for a video signal having a simple arrangement which can always detect a precise reference time.

DISCLOSURE OF INVENTION

According to the present invention, a reference time detecting circuit for detecting a predetermined transit of a synchronizing signal taken as a reference time of a video signal is disclosed, in which when detecting the reference time by using a masking pulse including the predetermined transit portion and the video signal, the level for detecting the transit portion is set at the side over a half level of the synchronizing signal level, and a detecting signal and the masking pulse are supplied to a flip-flop circuit from which an output signal is derived.

Thus, in accordance with this invention, since the detecting level is set at the side over a half level of the synchronizing signal level, the referece time can be detected by a first pulse in a range of the masking pulse. Furthermore, since this signal and the masking pulse are supplied to the flip-flop circuit, a reference time signal can be formed quite easily.

BRIEF DESCRIPTION OF DRAWINGS

FIGS. 1, 2, 3A, 3B, and 4 are respectively diagrams useful for explaining prior art ghost signal cancelling apparatus;

BEST MODE FOR CARRYING OUT THE INVENTION

An embodiment of the present invention will hereinafter be described with reference to the drawings.

Figure 6:
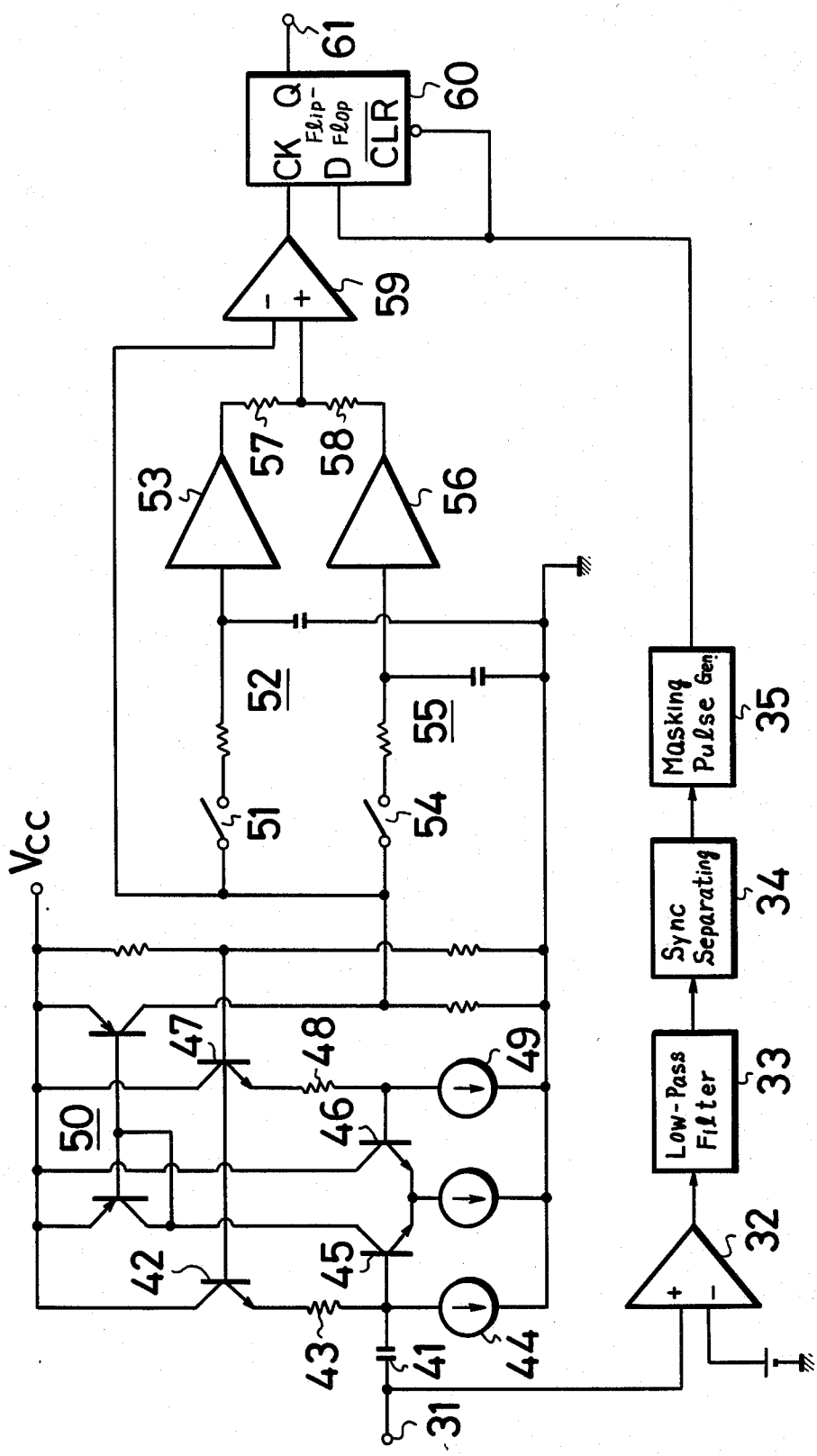
FIG. 6 is a circuit diagram of an embodiment according to this invention.

In FIG. 6, reference numeral 31 represents an input terminal to which a video signal is supplied. The signal from the terminal 31 is supplied to a synchronizing separating circuit formed of a comparator 32 and a low-pass filter 33. The signal from the low-pass filter 33 is supplied to a vertical synchronizing separating circuit 34 formed of a low-pass filter. The vertical synchronizing signal separated by the synchronizing separating circuit 34 is supplied to a masking pulse generating circuit 35 which then generates a masking pulse corresponding to the ½H period including the rising edge of the vertical synchronizing signal.

Also, the signal from the input terminal 31 is supplied through a clamping capacitor 41 to the connection point between a resistor 43 and a constant current source 44 in a series circuit formed of a transistor 42, the resistor 43 and the constant current source 44 which construct a bias circuit. The signal at this connection point is supplied to the base of a transistor 45 which composes a differential amplifier. The base of other transistor 46 is supplied with a voltage at the connection point between a resistor 48 and a constant current source 49 in a series circuit formed of a transistor 47, the resistor 48 and the constant current source 49 which form a bias circuit. A signal current flowing through the collector of the transistor 46 is derived via a current mirror circuit 50.

This signal is supplied through a switch 51 to a low-pass filter 52 and a buffer amplifier 53, while it is also supplied through a switch 54 to a low-pass filter 55 and a buffer amplifier 56. The signals from the buffer amplifiers 53 and 56 are added together through resistors 57 and 58 and then fed to a comparator 59. The signal from the current motor circuit 50 is supplied to the comparator 59.

The masking pulse from the generating circuit 35 is supplied to a D terminal of a D-type flip-flop circuit 60, and to the CLR terminal of the flip-flop circuit 60. The signal from the comparator 59 is supplied to the clock terminal of the flip-flop circuit 60, and so the output of the flip-flop circuit 60 is delivered to an output terminal 61.

Figure 7A:
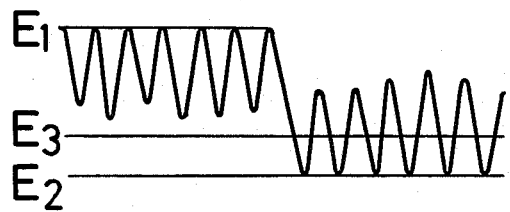
FIGS. 7A to 7F are diagrams illustrating operation of the invention.
Figure 7B:
Figure 7C:

In this circuit, the current mirror circuit 50 generates a signal as, for example, shown in FIG. 7A. For this signal, the switches 51 and 54 are turned on during period as, for example, shown in FIGS. 7B and 7C, respectively. Thus, the buffer amplifiers 53 and 56 generate voltages ($E_1$ and $E_2$) corresponding to the pedestal and sync-tip levels of the synchronizing signal, respectively. These voltages are added together through the resistors 57 and 58. Here, it is assumed that the resistance values of the resistors 57 and 58 are $R_1$ and $R_2$. Then, a voltage $E_3$ obtained by the addition becomes as follows.

$$E_3 = \frac{E_1 R_2 + E_2 R_1}{R_1 + R_2}$$

Figure 1:
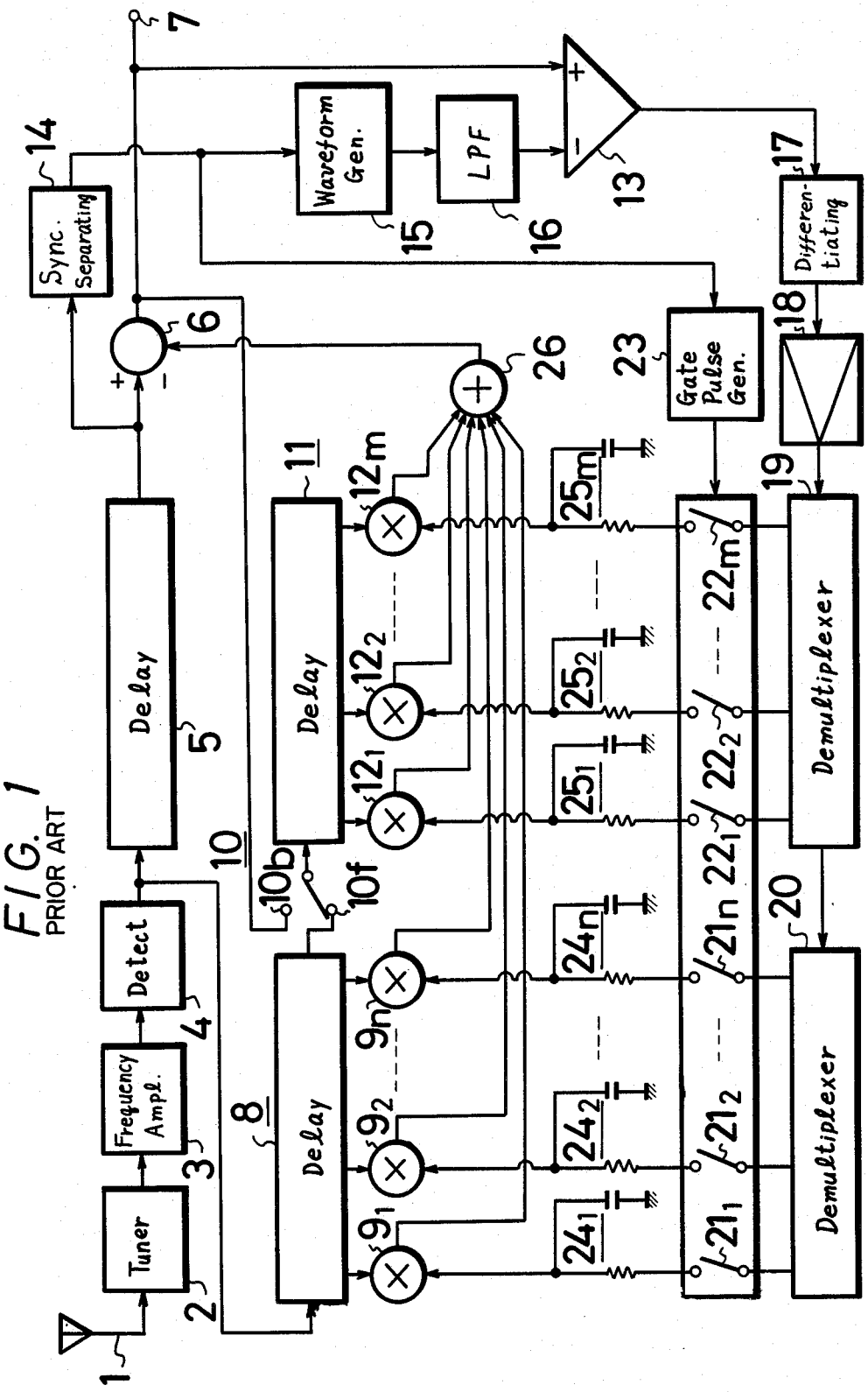
Figure 4:
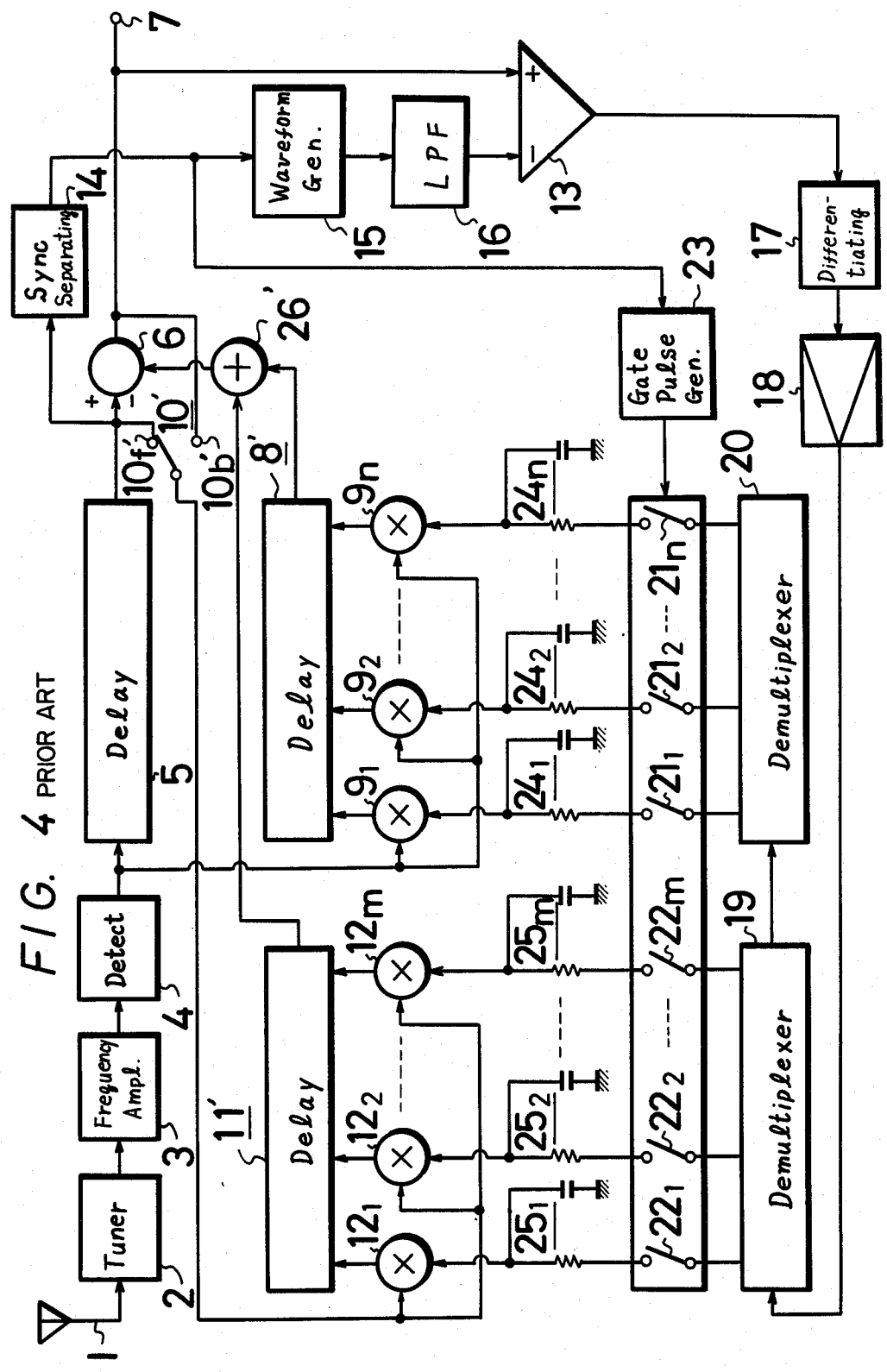
Figure 5A:
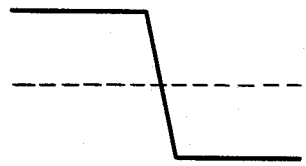
FIGS. 5A and 5B are diagrams useful for explaining a prior art circuit.
Figure 5B:
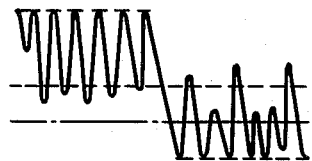

If $R_2 < R_1$ is satisfied, $$E_3 < \frac{E_1 + E_2}{2}$$

is established. The resistance values $R_1$ and $R_2$ are adjusted so as to make the voltage $E_3$ equal to a level as, for example, shown by a chain line in FIG. 5B.

Figure 7D:
Figure 7E:
Figure 7F:

The voltage $E_3$ is supplied to the comparator 59 so that the comparator 59 generates a signal as shown in FIG. 7D. Meanwhile, the masking pulse generating circuit 35 generates a signal as shown in FIG. 7E. These signals are supplied to the flip-flop circuit 60 so that a signal as shown in FIG. 7F appears at the output terminal 61.

In this way, the detection of the reference time is performed. According to the present invention, since the detection level is set at the side over a half level of the synchronizing signal, the reference time can be detected by a first pulse within the range of the masking pulse. Furthermore, since this signal and the masking pulse are supplied to the flip-flop circuit, the reference time signal can be generated quite easily.

It is possible that detection level (voltage $E_3$) to be supplied to the comparator 59 is not limited to the fixed one as aforesaid but may be such one which can be varied in response to the detected level of noise.

This invention is particularly effective for use with a ghost cancelling apparatus in which the demultiplexer and the delay circuit are used in common.

Figure 8:
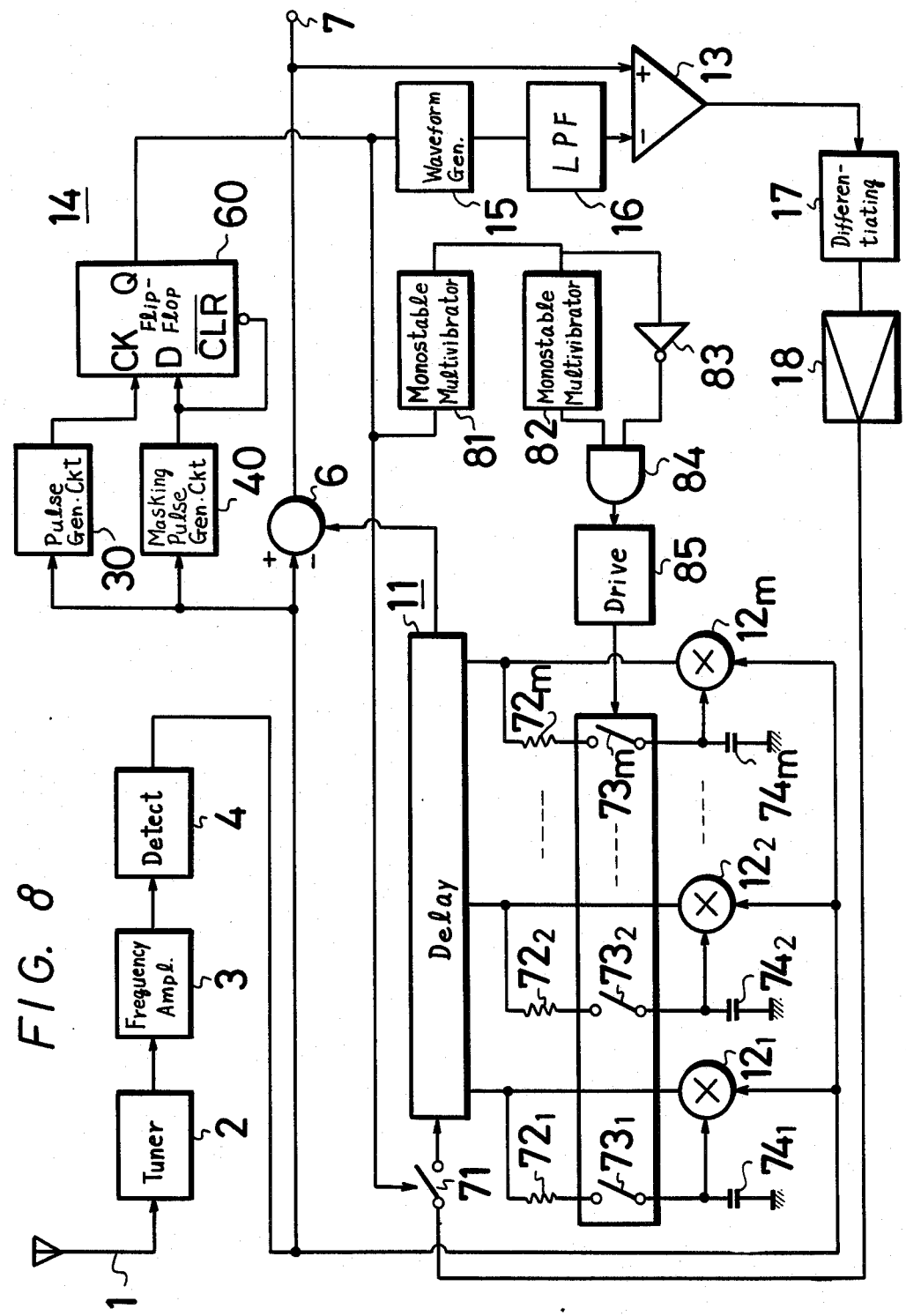
FIG. 8 is a circuit diagram of another ghost signal cancelling apparatus.

FIG. 8 shows an example of such ghost cancelling apparatus. In the figure, for the sake of simplicity, the delay-ghost signal is eliminated by the input-adding type transversal filter in the feedback mode.

In the figure, a ghost detecting signal from the amplifier 18 is supplied through a switch 71 to the delay circuit 11 and the signals derived from the respective stages are supplied through resistors $72_1, 72_2 \ldots 72_m$ and switches $73_1, 73_2 \ldots 73_m$ to capacitors $74_1, 74_2 \ldots 74_m$. The signals from the capacitors $74_1$ to $74_m$ are supplied to the weighting circuits $12_1$ to $12_m$ from which the weighted video signals are supplied to the respective taps of the delay circuits 11.

In this apparatus, the switch 71 is turned on during a predetermined period after the rising edge of, for example, the vertical synchronizing signal, while the switches $73_1$ to $73_m$ are turned on during a predetermined short period from a time point at which the delay time of the delay circuit 11 elapses after the rising edge of the vertical synchronizing signal. It should be assumed that the period during which the switch 71 is turned on lasts after a time point at which the switches $73_1$ to $73_m$ are turned on.

Figure 9A:
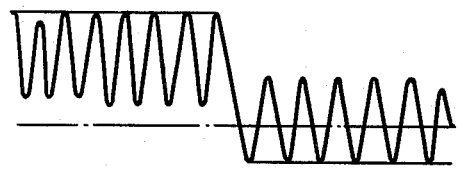
FIGS. 9A to 9G are diagrams illustrating operation of the invention.
Figure 9B:
Figure 9C:
Figure 9D:

In that case, when supplied with a rising edge as, for example, shown in FIG. 9A, a circuit 40 including the aforesaid comparator 32 to the generating circuit 35 generates a masking pulse as shown in FIG. 9B, while a circuit 30 including the capacitor 41 to the comparator 59 generates a pulse shon in FIG. 9C. Since these pulses are supplied to the flip-flop circuit 60 from which a signal as shown in FIG. 9D is derived, the switch 71 can directly be controlled by using this signal.

Figure 9E:
Figure 9F:
Figure 9G:

This signal is supplied to a monostable multivibrator 81 which forms a pulse of a duration corresponding to the delay time of the delay circuit 11 as shown in FIG. 9E which is then supplied to a monostable multivibrator 82 which then forms a pulse with a duration somewhat longer than that of the former as shown in FIG. 9F. These signals are supplied directly and through an inverter 83 to an AND circuit 84 which generates a pulse as shown in FIG. 9G. This signal is supplied to a drive circuit 85 by which the switches $73_1$ to $73_m$ are controlled.

As set forth above, the ghost cancelling apparatus is formed in which the demultiplexer and the delay circuit are used in common. In this case, according to the present invention, the switch 71 can directly be controlled by the signal from the flip-flop circuit 60. When generating the control signal for the switches $73_1$ to $73_m$, the signal is formed as a single pulse so that the signal can be formed quite easily.

As described above, according to the present invention, the precise reference time signal can be obtained by a simple arrangement.

This invention is not limited to the detection of the rising edge of the vertical synchronizing signal but can also be applied to the detection of other reference time.

We claim:

1. In a reference time detecting circuit for detecting a predetermined transit of a synchronizing signal for use as a reference time for a video signal, a combination comprising; means for generating a masking pulse during the period of said transit and a part of said video signal, means for comparing said video signal with a predetermined level set at less than the level of said synchronizing signal, and a flip-flop having one input connected to receive said masking pulse and another input connected to said comparing means for developing a signal corresponding to operation of said comparing means within the period of said masking pulse.

2. Apparatus according to claim 1 including means for resetting said flip-flop at the end of said masking pulse.

3. Apparatus according to claim 1 wherein said comparator means includes first means for producing a first voltage having a level corresponding to the envelope of said video signal during a first period coincident with said masking pulse, means for developing a second voltage having a level corresponding the envelope of said video signal during another time period coincident with said masking pulse, means for developing a voltage intermediate between said first and second voltages, and wherein said comparator means has one input connected to said intermediate voltage and another input connected to said video signal, for developing an output in response to the video signal assuming a level which crosses through said intermediate voltage level.

4. Apparatus according to claim 1 wherein said flip-flop is a D-type flip-flop, and including means for connecting said masking pulse to a data input of said flip-flop, and means for connecting said comparator to a clock input of said flip-flop.

* * * * *